United States Patent [19]

Stürzinger et al.

[11] 4,350,844
[45] Sep. 21, 1982

[54] ENCIPERING- AND DECIPHERING APPARATUS IN THE FORM OF A TYPEWRITER

[75] Inventors: Oskar E. Stürzinger, Baar; Peter Frutiger, Wangen, both of Switzerland

[73] Assignee: Anstalt Europaische Handelsgesellschaft, Liechtenstein

[21] Appl. No.: 743,130

[22] Filed: Nov. 19, 1976

[30] Foreign Application Priority Data

Nov. 20, 1975 [CH] Switzerland ............ 15063/75

[51] Int. Cl.³ ................................ H04L 9/02
[52] U.S. Cl. .................... 178/22.18; 178/22.12; 178/22.19
[58] Field of Search ............ 178/22, 79–81, 178/22.18, 22.19, 22.12

[56] References Cited

U.S. PATENT DOCUMENTS

| | | | |
|---|---|---|---|
| 3,057,955 | 10/1962 | Hirsch | 178/22 |
| 3,083,263 | 3/1963 | Hagelin et al. | 178/22 |
| 3,229,037 | 1/1966 | Sturzinger et al. | 178/22 |
| 3,267,213 | 8/1966 | Berger | 178/22 |
| 3,291,908 | 12/1966 | Ehrat | 178/22 |
| 3,485,948 | 12/1969 | Hagelin | 178/22 |
| 3,670,104 | 6/1972 | Abrahamsen | 178/22 |
| 3,878,332 | 4/1975 | Morgan et al. | 178/22 |
| 3,976,995 | 8/1976 | Sebestyen | 340/337 |
| 4,016,365 | 4/1977 | Staar | 178/81 |

*Primary Examiner*—Howard A. Birmiel
*Attorney, Agent, or Firm*—Ostrolenk, Faber, Gerb & Soffen

[57] ABSTRACT

An enciphering and deciphering apparatus in the form of a typewriter having an input device for the input of characters to be processed, a control device for the input of control commands determining the mode of operation of the apparatus and an output device possessing at least one page printer. A display device is connectable with the input device for the stepwise progressive display of the infed characters. The output side of the display device can be selectively connected with the printer, with a cipher computer or a key character storage associated with the cipher computer. The cipher computer has its output side connectable with the printer. A central control unit is provided which can be controlled by the control device. The central control unit fixes as a function of the infed control commands the data routes in the apparatus and controls the components of the apparatus, and depending upon the infed control commands the printer receives and prints the characters displayed by the display device or the characters produced by the cipher computer.

13 Claims, 8 Drawing Figures

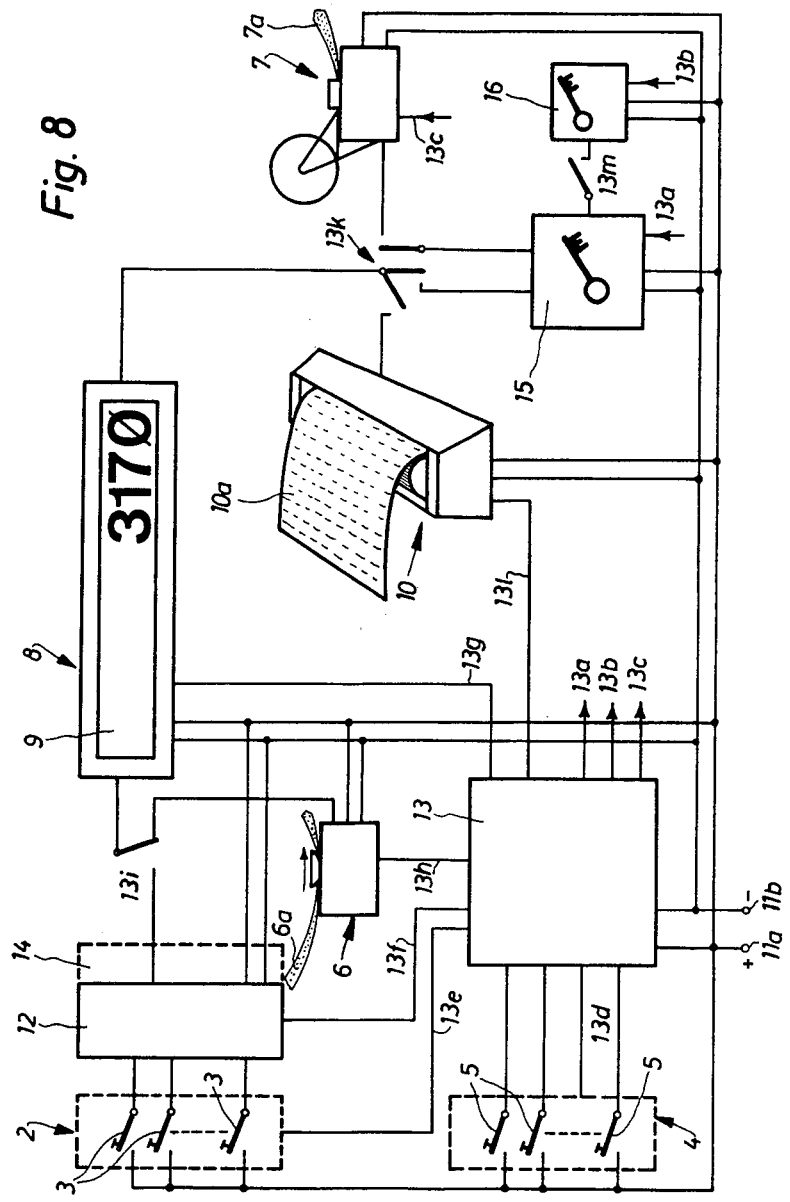

ENCIPERING- AND DECIPHERING APPARATUS IN THE FORM OF A TYPEWRITER

BACKGROUND OF THE INVENTION

The present invention relates to a new and improved construction of enciphering- and deciphering apparatus in the form of a typewriter having an input device for entering the characters to be processed, a control device for entering of control commands determining the mode of operation of the apparatus, and an output device possessing at least one page printer or printing mechanism.

With cipher equipment for the enciphering and deciphering of information the entered (primary) text or message should always be at least partially always visible to the operator, whereas the processed (secondary) text or message should be available as quickly as possible in a printed form.

There are known to the art mechanically operating devices, for instance from U.S. Pat. No. 2,765,364, wherein, for this purpose, there are provided two parallelly operating tape printers. However, such a solution is complicated in its construction, if page printers are considered.

SUMMARY OF THE INVENTION

Hence, it is a primary object of the present invention to provide a new and improved construction of a ciphering device in the form of a typewriter which is not associated with the aforementioned drawbacks and limitations of the prior art constructions.

Another and more specific object of the present invention is to provide an apparatus, of the foregoing type, which possesses a compact construction and fulfills the abovementioned requirements at a low cost. Such an apparatus should permit rapid enciphering and deciphering in a most reliable manner. As used herein, the term "ciphering" refers to enciphering and deciphering, if not otherwise specified.

In order to implement the foregoing and still other objects of the invention, which will become more readily apparent below, the apparatus of the present invention is manifested by the provision of a display or indicator device for the stepwise progressive display of the entered characters, the input of the display device being connected with the input device, the output of the display device being connected with the printer, with a cipher computer or with a key character storage associated with the cipher computer. The cipher computer is connectable at its output with the printer. Further, there is provided a central control unit which can be controlled by the control device. This central control unit, as a function of the entered control commands, determines the data routes or paths in the apparatus and controls the components of the apparatus, such as a tape perforator, the display device, the printer, the cipher computer and the key character storage. Depending upon the entered control commands the printer receives the characters displayed by the display device or the characters produced by the cipher computer and prints-out such characters.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 7 and 8 illustrate the different operating conditions of the apparatus according to FIG. 3.

DETAILED DESCRIPTION OF THE PREFERRED EMBODIMENTS

Describing now the drawings, in the description to follow the apparatus for ciphering of text or messages will be simply conveniently referred to hereinafter as a cipher apparatus.

Figure 1:
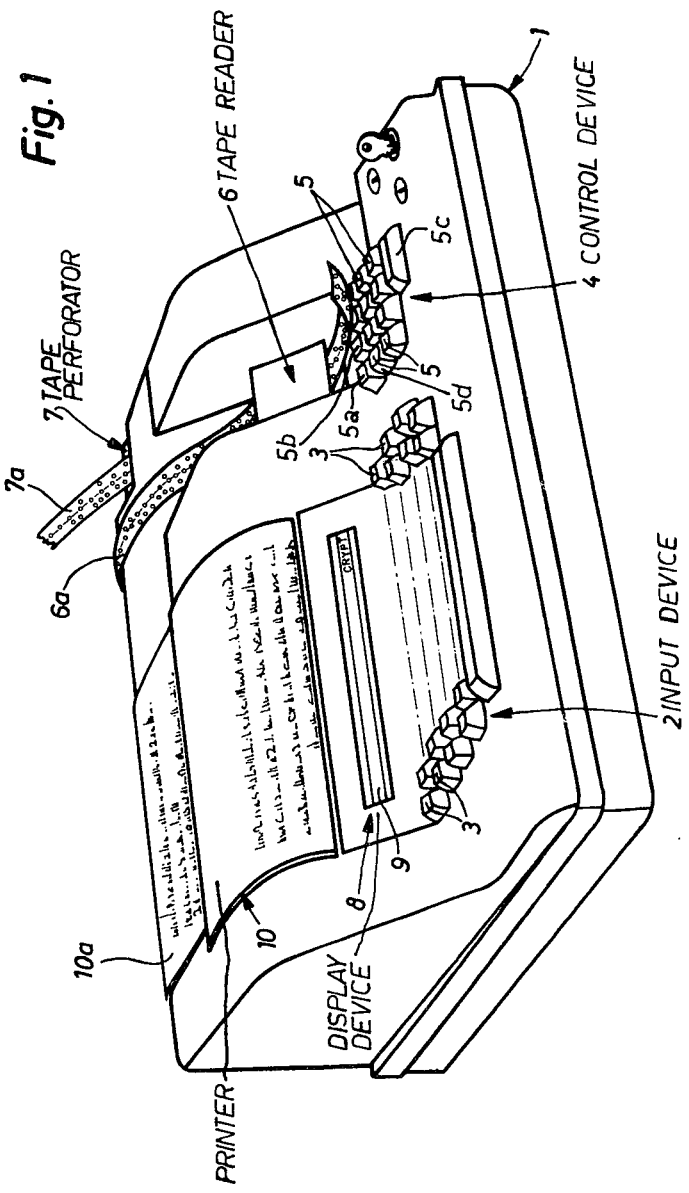
FIG. 1 is a perspective view of cipher apparatus in the form of an office typewriter.

As best seen by referring to FIG. 1, the cipher apparatus advantageously possesses the form of an office typewriter. The components of the apparatus are housed to the extent possible in a housing 1. The apparatus possesses an input device which comprises an input keyboard 2 having, for example, the push buttons 3, serving to enter the characters to be processed. Moreover, there is provided a control device comprising a control keyboard 4 having, for example, control push buttons 5. Control keyboard 4 is provided for the purpose of entering control commands which determine the mode of operation of the apparatus.

The similar keyboards 2 and 4 are of conventional construction and can be obtained on the market from, for instance, any of the following firms: Licon, Alps, and Honeywell.

In addition to the foregoing, the apparatus includes a perforated tape reader 6 provided with the perforated tapes 6a and a perforated tape punch or perforator 7 having the perforated tape 7a.

The perforated tape reader 6 and the tape punch 7 both of conventional construction and can be obtained, for example, from any of the following firms: Addmaster, GNT, Addo or Teletype. Addmaster, GNT, Addo or Teletype.

Additionally, there is provided an optical display or indicator device 8 having an indicator or display field 9 where there are displayed the characters in the form of a preferably stepwise running text or message. The display device 8 can be procured, for instance, from Burroughs Corporation.

Additionally, there is provided for the apparatus a page printing mechanism 10 which prints characters upon a sheet or page 10a. Such page printers are available from, for instance, any of the following well known companies: Diablo, NCR, and Loqabax.

The most important components and groups of components which are housed within the housing 1, and not externally visible, are illustrated in FIGS. 2 to 8. All possible further components, needed for the correct functioning of the equipment and its utilization and construction, are well known to those skilled in the art, and inasmuch as the details thereof are not necessary to understand the underlying principles of the present invention, for the sake of simplicity, the same have not hereinafter been illustrated or described.

Figure 2:
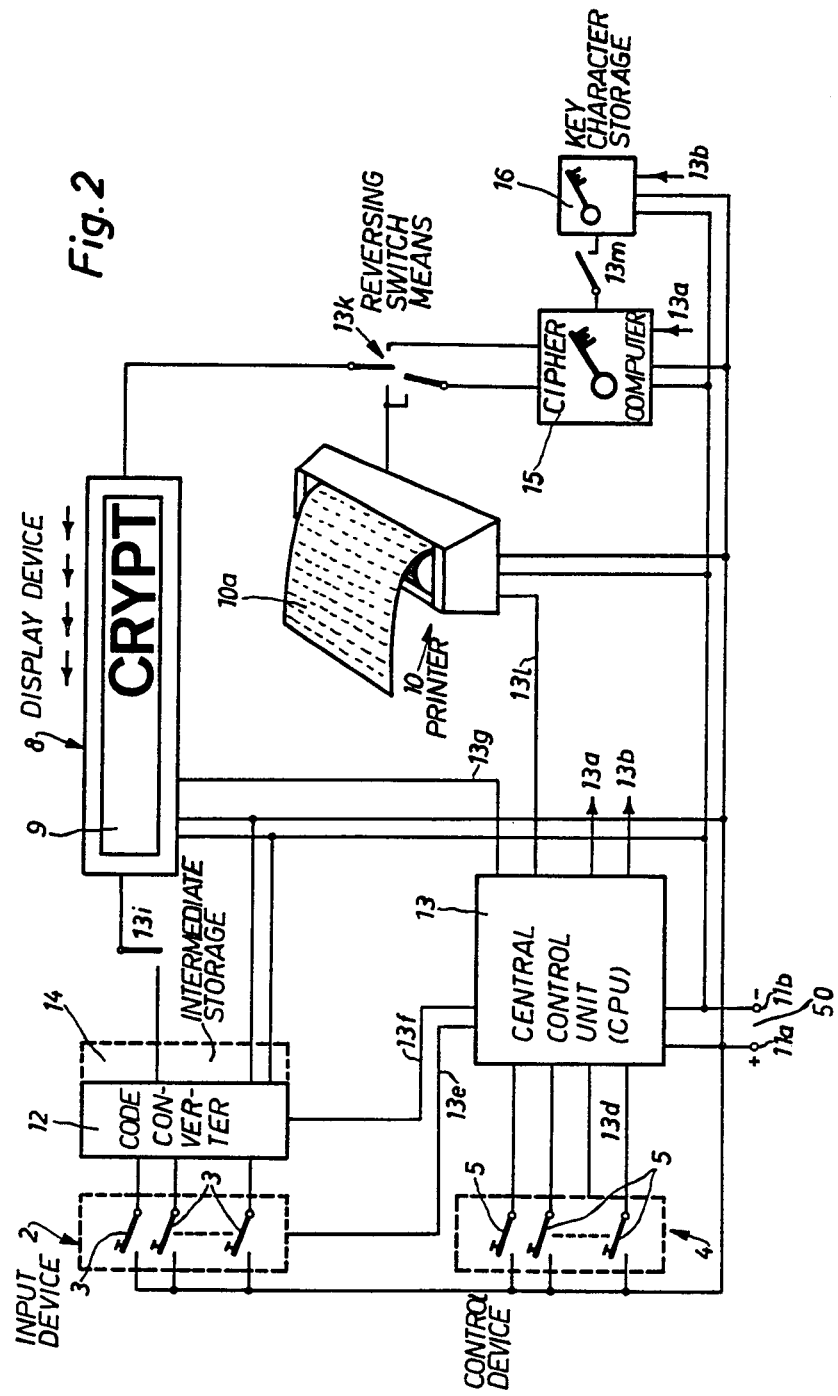
FIG. 2 is a block circuit diagram of a first exemplary embodiment of the cipher apparatus.
Figure 3:
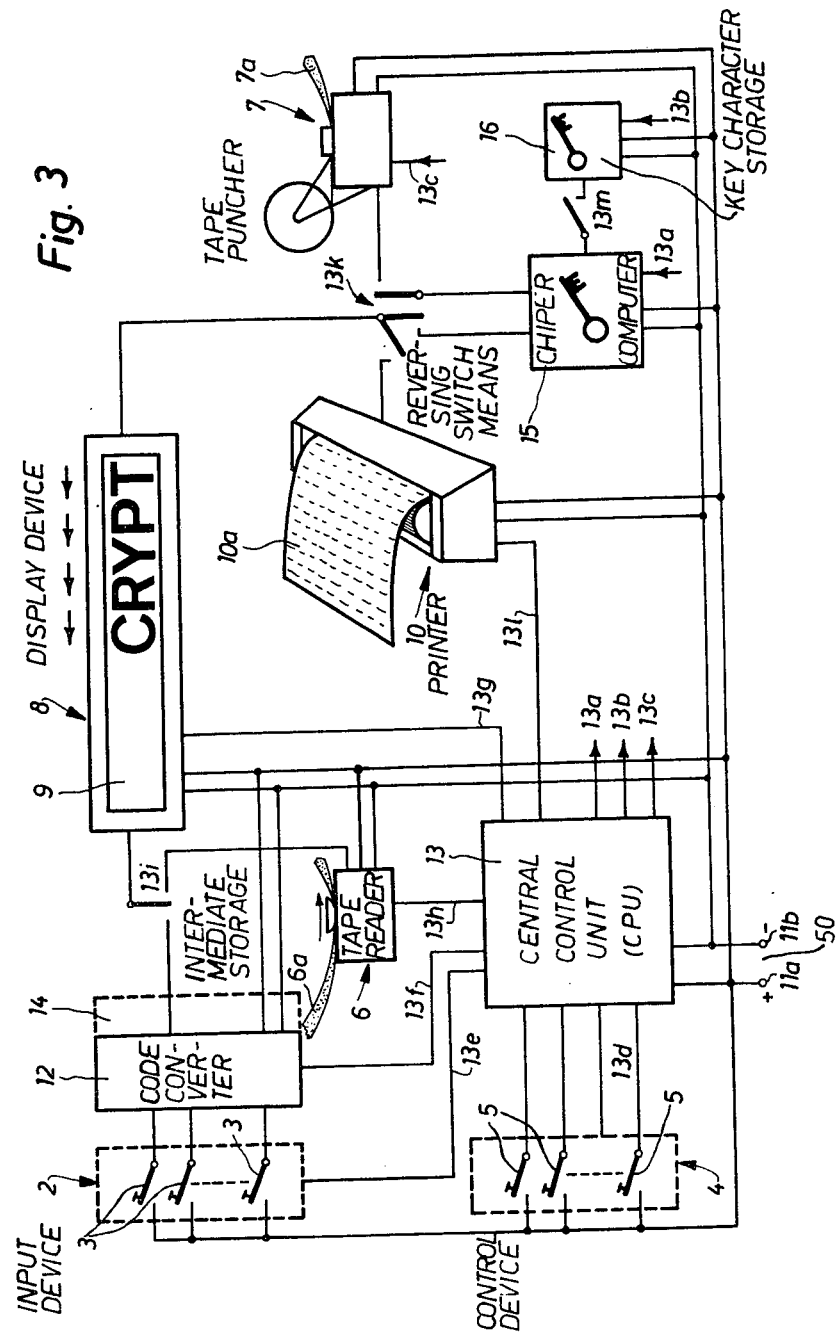
FIG. 3 is a block circuit diagram of a second exemplary embodiment of the cipher apparatus.

The exemplary embodiments illustrated by means of the block circuit diagrams in FIGS. 2 and 3 are the same, with the exception that the embodiment of FIG.

2 is constructed without a perforated tape reader and a tape punch. Therefore, it will be understood that corresponding components have been conveniently designated throughout with the same reference characters.

The block circuit diagrams referred to above illustrate, in addition to the most important components, also their mutual interconnection of the components.

The apparatus is connected by means of the terminals 11a and 11b with a power or voltage source (not illustrated) generally indicated by reference character 50. The voltage source is connected to the various components of the apparatus.

The push buttons 3 of the input keyboard 2 of the input device are connected, on the one hand, with the aforementioned power or voltage source 50, and, on the other hand, with a code converter 12. This code converter 12 forms, in conventional manner, the characters entered by depressing the contact push buttons 3, according to a code, for instance the 5-unit code or 8-unit code according to CCITT No. 2 or CCITT No. 5 respectively, (in the U.S.A. mostly known as Baudot or ASCII Codes.) Such transformation into a binary code allows for simple information processing, so that instead of the 26 or more individual conductors or lines in the case of series portrayal, there is only required a single conductor or line, or in the case of parallel protrayal only 5 or 8 conductors or lines.

It is also conceivable to use, instead of a contact keyboard, a keyboard which delivers pulses or directly delivers in coded form. In such case, it is possible to dispense with the use of the code converter 12.

Additionally, the keyboard 2 of the input device is connected by means of the conductor or line 13e at a central processing control unit (CPU) 13.

The push buttons 5 of the control keyboard 4 of the control device are also connected to the power source 50 and, via the conductors 13d, to the central control unit 13. Control commands are entered into the central control unit 13 by push buttons 5. Depending upon the construction of the keyboard 4 and the central control unit 13 a code converter can be arranged in series after the keyboard 4, as such has already been explained for the code converter 12. The control keyboard 4 possesses, among other things, extinguishing and correction push buttons, such as the buttons 5a and 5b of FIG. 1, which render possible correction of the entered message or text prior to processing.

The central control unit 13 influences the entire functional operation or functional sequence occurring within the apparatus and can consist of, for instance, a microproessor with appropriately programmed control command memories or storages. Such microprocessors are available on the market, for instance, from any of the following companies: Intel, Motorola, and Radio Corporation of America (RCA).

By means of the conductor or line 13g the display device 8 is connected with the control unit 13. The display device 8 can be selectively connected at its input side by means of the reversing or selector switch 13i with the input keyboard 2 or with the perforated tape reader 6 (see the embodiment of FIG. 3). There is preferably connected between the code converter 12 and the display device 8 an intermediate storage 14 which has been shown in dashed lines in FIGS. 2 to 8 of the drawings. This intermediate storage or memory 14 is advantageously a shift register. A possible construction and mode of operation of such type shift register has been disclosed, for instance, in the publication "Elektronik", 1971, volume 3, page 75 et seq.

Among other things, the intermediate storage 14 serves to take up possible required supplemental characters and to arrange them properly in the character sequence. Such supplemental or supplementary characters are, for instance, necessary if the input keyboard 2 is constructed to operate alpha-numerically and the apparatus, during enciphering, should only deliver letters at the output side. In such instances, there is connected in series forwardly of the intermediate storage 14 a so-called concentration circuit, for instance of the type disclosed in U.S. Pat. No. 3,480,729, the disclosure of which is incorporated herein by reference, and which automatically inserts additional control signals into the sequence of character signals, which control signals likewise must be processed as such. The intermediate storage or memory 14 is constructed in such a manner that the information is delivered to the display or indicator device 8 at a maximum speed and such intermediate storage receives new information from the input keyboard 2 and from the aforementioned concentration circuit, respectively.

In the display field 9 of the display device 8 there are rendered visible the characters arriving for instance from the right. Preferably, only the characters introduced by means of the keyboard 2 are displayed, whereas the control signals produced by the concentration circuit are further transmitted without being displayed. Therefore, it is also possible to connect the concentration circuit after the display device 8, so that there is not required any character suppression.

The characters visible in the display field or zone 9 appear at the right edge of such display field 9 and travel or shift one step towards the left each time a new character is introduced, so that each new character appears for the first time at the right edge. The outermost or extreme character at the left edge of the display field 9 disappears during the next displacement step and is processed. The operator therefore always views that many non-processed characters as can be accomodated in the display field 9.

If there appear in the display field 9 large, readily visible characters, then the control is easier for the operator to carry out than if the characters are directly printed and if there is utilized for control purposes a relatively small, under circumstances, weak or pale print.

Generally, it is sufficient if the indicator or display field 9 permits simultaneous display of approximately 30 characters, corresponding to about one-half of a teleprinter line. The operator always then recognizes the relevant location in the text or message, so that he or she can correct possible errors prior to processing, so that there is available for ciphering an error-free plain (or crypto) text copy.

The printer or printing mechanism 10 is connected by means of the conductor or line 13l with the central control unit 13 and is additionally selectively connectable by means of the reversing or selector switch 13k with the display device 8 or a so-called cipher computer 15, which can be connected at its input side with the display device 8. The cipher computer 15 carries out the actual enciphering and deciphering of the entered characters and is coupled with a key character storage or memory 16 which, like the cipher computer 15, is connected in circuit with the central control unit 13, as shown.

The key character storage 16 can be, for instance, a ferrite core memory or ferrite storage or a random access memory (RAM) of known construction. When appropriate, the key character storage 16 can be designed as a pluggable or plug insertable unit, for instance of the type disclosed in U.S. Pat. No. 3,988,721, the disclosure of which is incorporated herein by reference.

The cipher computer 15 produces, in conventional manner, based upon the key character information received from the key character storage 16, for each entered plain character, one or several crypto characters and vice versa. The cipher computer 15 can operate, for instance, according to the principles described in U.S. Pat. Nos. 3,006,081 or 3,683,513, or Swiss patent No. 443,744, the disclosure of which likewise is incorporated herein by reference, wherein, however, for the construction thereof there are preferably employed modern electronic components (integrated circuits). As shown in FIG. 3, the cipher computer 15 can be connected at its output side with the printer 10 and/or with the tape perforator or perforated tape puncher 7, by appropriately actuating the reversing or selector switch means 13k.

The key character storage 16 can be connected through the agency of the display device 8 and the cipher computer 15 with the input keyboard 2, again by suitably manipulating the switches 13m and 13k.

Figure 7:
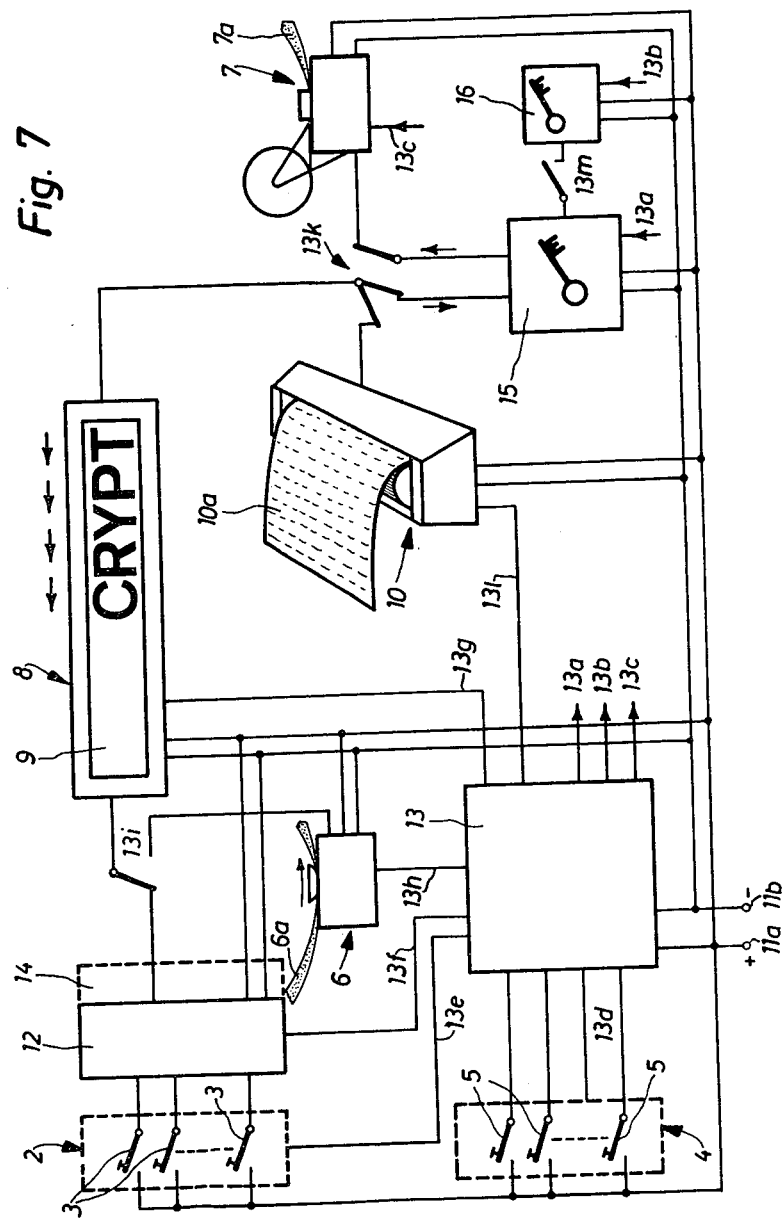

With the exemplary embodiment illustrated in FIGS. 3, 7 and 8, as mentioned, there are provided a perforated tape reader 6 for the data input and a tape punch or perforator 7 for the data output. This enables employing the cipher apparatus in conjunction with a teleprinter unit, and the perforated tapes 6a and 7a respectively, form as data carriers the storage- and connection link between the cipher apparatus and the teleprinter unit.

It is also possible to use, instead of the perforated tapes, a carrier for a magnetic layer or coating in the form of tapes, disks or foils. Instead of the perforated tape reader 6 there is then employed a reader unit for the magnetic layer-carrier, whereas the tape punch 7 is replaced by a recording device or recorder for the magnetic layer-carrier. Conceptually, then the components 6 and 7 can be considered to constitute, in such case, such reader and recorder, respectively.

When using magnetic tapes as data carriers there can be employed, for instance, Compact Cassettes, which are already used in electronic data processing installations and available on the market, for instance, from any one of the following firms: Bell & Howell, Memodyne, and Datum.

The perforated tape reader 6 and the tape punch 7 and the corresponding above mentioned recorder and reading devices for magnetic coated-carriers can completely or partially receive the information input and the information output respectively. The keyboards 2 and 4 therefore, under circumstances, can be replaced by perforated tape readers or reader devices for magnetic coated-carriers.

As already mentioned, the central control unit 13 controls all of the functional operations in the apparatus. In order to better understand the relevant functional operations there have been illustrated in FIGS. 2 to 8 the switching means 13a to 13m associated with the control unit 13, which have been purely symbolically illustrated in part as switches and in part as control lines. In practice these components generally, without exception, are in the form of control lines, since in the electronics art pure switching functions can be carried out by appropriately controlling suitable components. The illustration by means of switches therefore has been chosen solely to improve the explanation of the data flow within the apparatus.

Based upon the showing of FIGS. 4 to 8, which correspond to the respective block circuit diagrams of FIGS. 2 and 3, there now will be described the different functional operations in the apparatus.

Figure 4:
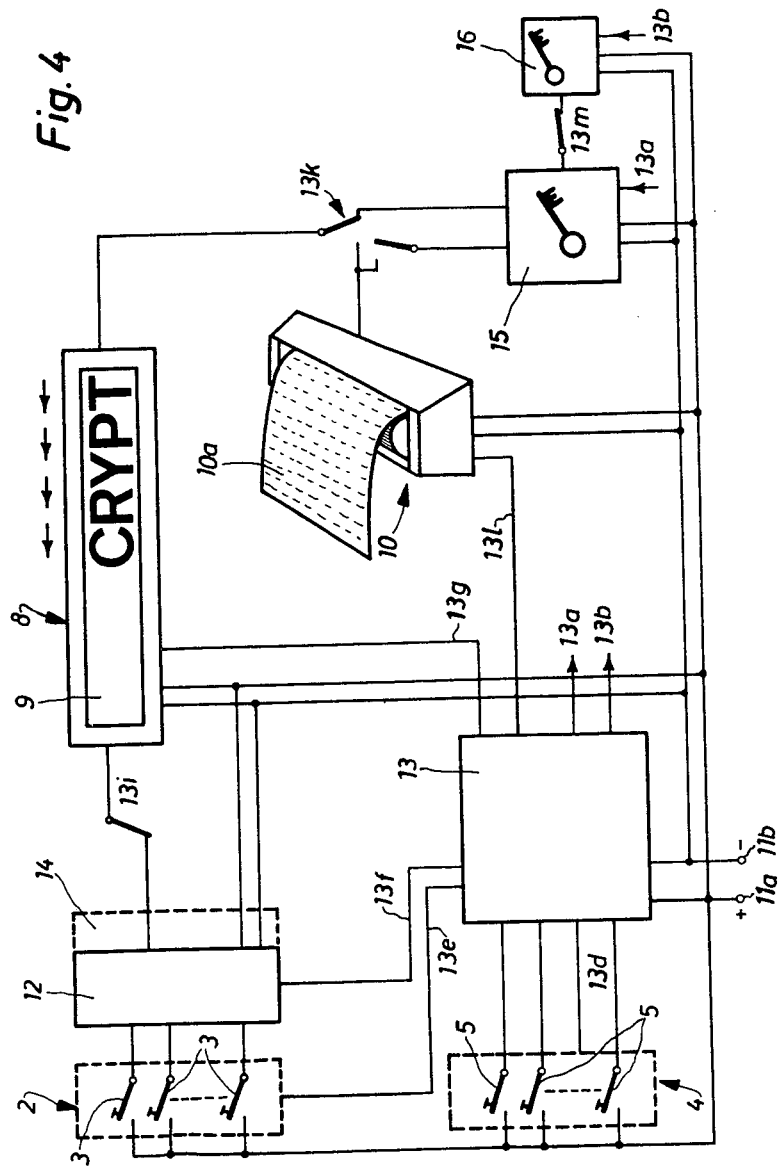
FIGS. 4, 5 and 6 illustrate the different operating conditions of the apparatus according to FIG. 2.

FIG. 4 illustrates the operating state during the entering of the key character information to the key character storage 16. This mode of operation will be called the key character storage mode. This input or setting operation occurs preferably by means of the input keyboard 2, but however can also occur by means of the perforated tape reader 6 (FIG. 3). Each entered key character appears, as mentioned above, at the right edge of the display monitor or field 9. As set forth above, errors can be corrected before the key characters are stored in the key character storage 16. The data route or path is determined in FIG. 4 by the closed switches 13i, 13k and 13m. The central control unit 13 brings about a correct allocation or ordering of the entered key characters in the key character storage 16 and upon reaching a given number of key characters blocks any further input. If the setting of the key characters has been completed, a space feed button, such as the button 5c of FIG. 1, on the control keyboard 4 is actuated in order to shift the key characters still stored in the display device 8 and to empty the display device 8.

Figure 5:
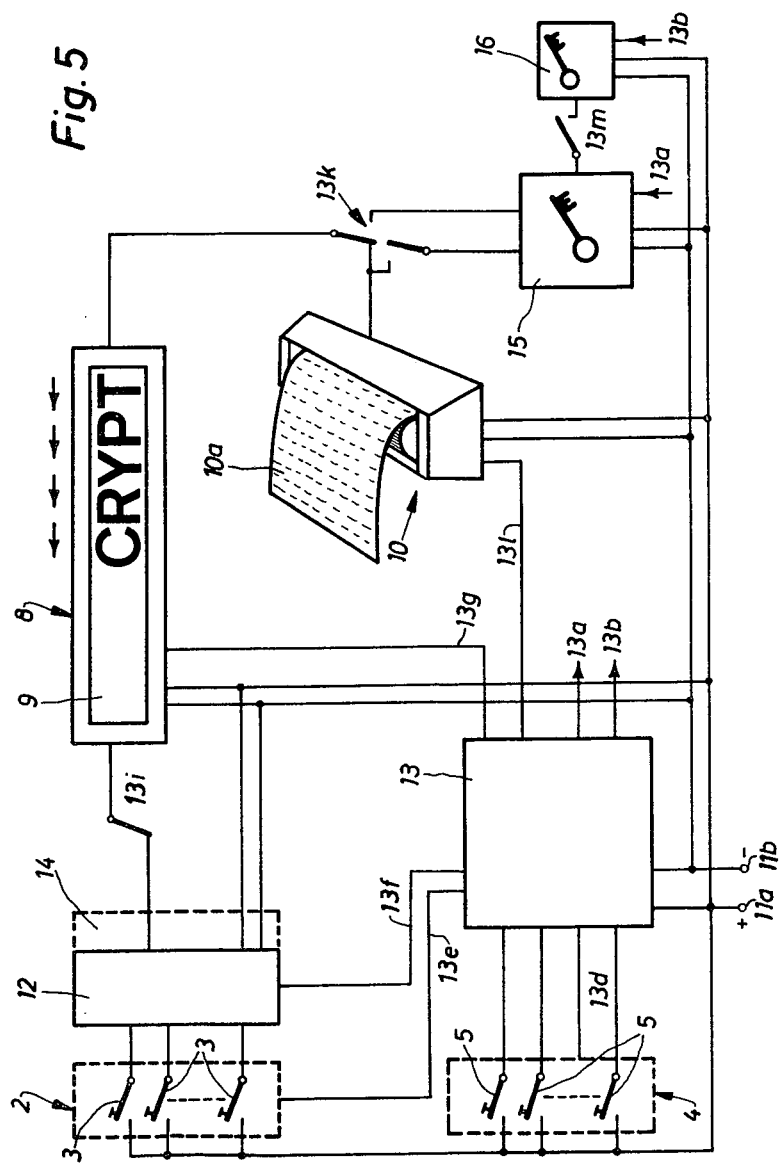

FIG. 5 illustrates the operating state or condition during printing of the plain message or text entered by means of the input keyboard 2 or the perforated tape reader 6 (FIG. 3). This mode of operation will be called the plain message mode. The entered text characters are displayed on the display device 8 and subsequently printed-out by means of the printer or printing mechanism 10. As noted the display device 8 may be cleared by actuating the space shift button 5c. In this case, the apparatus functions similarly to a conventional typewriter, wherein, however, the entered text characters are displayed prior to printing. When a tape punch 7 (FIG. 3) is used it is possible to transfer the entered characters to a perforated tape 7a.

Figure 6:
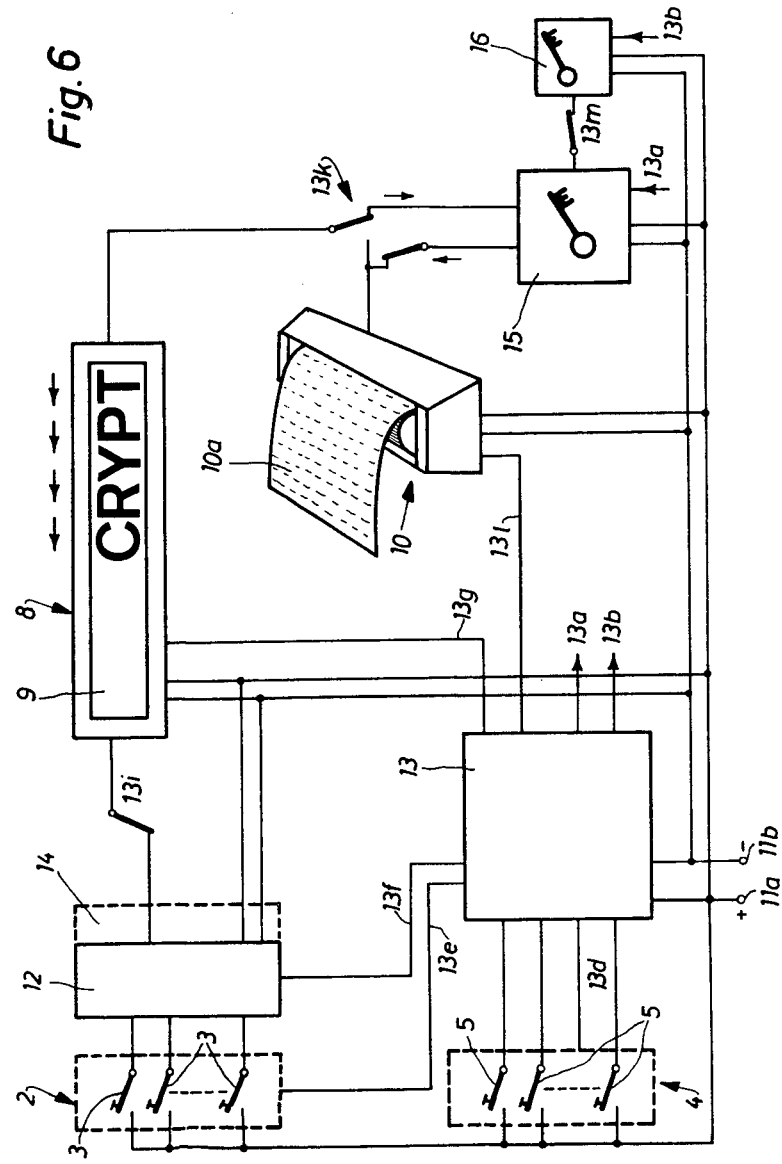

FIGS. 6 and 7 illustrate the operating state during enciphering and deciphering of the entered text or message. The characters introduced by means of the input keyboard 2 are displayed at the display device 8 in the already mentioned manner and subsequently arrive at the cipher computer 15 (FIG. 6). The cipher computer 15 then carries out the ciphering of the entered characters in a conventional manner, and it receives in each case from the key character storage 16 the key character information. The central control unit 13 controls the proper functional operations.

The text or message processed by the cipher computer 15 is then printed-out by the printer or printing mechanism 10.

As already previously mentioned, the character input also can be accomplished by means of a perforated tape 6a (FIG. 3) or a magnetic data carrier. Also certain control commands can be introduced by means of perforated or magnetizable data carriers instead of by means of the control keyboard 4.

At the end of the text input the space shift button 5c is again activated, in order to deliver the characters still stored in the display device 8 to the cipher computer 15 for processing.

The control unit 13 can also serve as a secondary character counter which counts the characters processed by the cipher computer 15. The control unit 13 then brings about printing of the total number of processed characters at least at the printed page or sheet 10a. This comment is of significance during the transmission of the crypto message or text by means of telegraph or radio.

The central control unit 13 can carry out further additional functions. During enciphering of an introduced plain message or text the control unit 13 arranges the crypto message or text preferably in 5-unit groups, and each line has 10 such 5-unit groups. The control unit 13 connected by means of the control line or conductor 13a with the cipher computer 15 delivers, by means of the conductor or line 13l, always at the proper moment, corresponding control commands to the printer 10.

During deciphering the central control unit 13 also can carry out a control of the entered crypto text for possible errors, as such has been disclosed in principle, for instance, in U.S. Pat. No. 3,849,599, the disclosure of which is incorporated herein by reference. The control unit 13 likewise can insure that the deciphered plain text or message is printed-out while in line formation, in that it again carries out counting functions and additionally evaluates a signal "word space" produced nearby the end of each line as a trigger command for switching to a new line, so that there is extensively avoided separation of words.

If, as shown in FIG. 7, the processed text or message is transmitted by means of the tape punch 7 to a perforated tape 7a, then there is carried out an appropriate control of the tape punch 7 by the central control unit 13. Since the perforated tape 7a is used for further processing the data at the teleprinter installation, it is necessary to introduce between the text characters also the required control command characters, in order that the text or message printed-out at the teleprinter installation is properly arranged. As shown in FIG. 7 the printer 10 printsout the entered text or message.

In FIG. 8 there is illustrated the operating condition during character entering by means of the perforated tape reader 6. Since the input occurs in this manner at high speed, the display of the entered characters at the display field 9 is not advantageous since a control is hardly possible. The entered characters are therefore delivered, without any display, to the cipher computer 15 and the printer 10 respectively. Since the shift register of the display device 8 associated with the display field 9 similarly serves, as previously discussed, as the intermediate storage, only the display in the display field 9 is suppressed.

However, it is advantageous in this case to employ the central control unit 13 for counting the entered characters and to continuously display the counter state in the display field 9. In this manner it is possible to localize any occurring fault or error in the tape.

As a general rule, the perforated tape 6a emanates from a teleprinter which delivers along therewith the printed text or message. The operator will be able to easily recognize, on the basis of the printed text, any possible errors or ambiguities which have been caused due to transmission errors, especially then if there is present a crypto text or message arranged in 5-letter groups. The operator remembers the error locations on the basis of the number of characters which are located in front of this location. During the entering of the text or message, as mentioned, there is of course displayed the number of entered characters. The passing of the perforated tape 6a is stopped approximately 30 characters before reaching the error location, i.e. approximately one-half of a teleprinter line, and specifically by actuating a correction button, such as the button 5b, of the control keyboard 4. Now the characters, stored in the shift register associated with the display field 9, are displayed at that display field 9. The perforated tape 6a may now be advanced stepwise by actuating a control button, such as the button 5d, and in the described manner there occurs a display of the characters in the display field 9. As soon as the error location has been reached and made visible, there can be undertaken a suitable correction. Thereafter, the perforated tape 6a is again moved in rapid travel through the perforated tape reader 6.

As used in the appended claims, the following terms shall be interpreted to include the specified structure:

(1) the term character input means shall comprehend the input keyboard 2, the perforated tape reader 6 a magnetic tape reader and/or equivalent structure;

(2) the term output means shall comprehend the printer 10, the tape punch 7, a magnetic tape recorder and/or equivalent structure.

If there appears a plain text at the perforated tape 6a, which is to be enciphered in the cipher apparatus, then in appropriate manner there can be undertaken corrections in the plain text or message prior to processing.

While there are shown and described present preferred embodiments of the invention, it is to be distinctly understood that the invention is not limited thereto, but may be otherwise variously embodied and practiced within the scope of the following claims.

Accordingly what is claimed is:

1. An enciphering and deciphering apparatus operable in at least a key character storage mode, a plain text mode, an enciphering mode, and a deciphering mode, said apparatus substantially in the form of a typewriter and comprising:

(A) a first keyboard for permitting an operator to enter both text and key character to be processed;

(B) a second keyboard for permitting an operator to enter control commands which determine the mode of operation of said apparatus;

(C) output means including at least one page printer;

(D) a cipher computer and a key character storage associated therewith, said cipher computer for enciphering and deciphering characters applied thereto when said apparatus is operating in said enciphering and deciphering modes, respectively, said cipher computer to encipher and decipher said characters applied thereto in accordance with at least one key character stored in said key character storage;

(E) display means for displaying said entered text and key characters in a progressive stepwise manner; and (F) central control unit means responsive to said control commands for operating said apparatus in the mode determined by said control commands, said central control unit means to:

(1) cause said entered key characters to be displayed by said display means in said progressive stepwise manner and to thereafter be stored in said key character storage when said apparatus is operated in said key character storage mode;

(2) cause said entered text characters to be displayed by said display means in said progressive stepwise manner and to thereafter be printed by said printer when said apparatus is operated in a plain text mode; and (3) cause said entered text characters to be displayed by said display means in said progressive stepwise manner and to thereafter be enciphered by said cipher computer and finally printed by said printer when said apparatus is operated in said enciphering mode.

2. The apparatus as defined in claim 1, wherein said outut means comprises a tape punch and means for connecting said tape punch to said central control unit means, said cipher computer and said display means.

3. The apparatus as defined in claim 1, wherein said output means comprises a recorder for data carriers possessing a magnetizable coating, means for connecting said recorder with said central control unit means, said cipher computer and said display means.

4. The apparatus as defined in claim 1, where said display means includes a display field through which said text and key characters travel in a stepwise manner from one edge to the other edge thereof, and means for applying said characters to said output means, said cipher computer or said key character storage after said characters travel across said display field in accordance with the mode of operation of said apparatus.

5. The apparatus as defined in claim 4, wherein said second keyboard includes a space shift button for emptying the display device by further shifting the characters still stored in the display means after completion of the input of said characters.

6. The apparatus as defined in claim 5, wherein the intermediate storage comprises a shift register.

7. The apparatus as defined in claim 1, further incuding a code converter connected between said first keyboard and said display means.

8. The apparatus as defined in claim 1, wherein said second keyboard includes extinguishing and correction button means for correcting erroneously introduced characters.

9. The apparatus as defined in claim 1, further including an intermediate storage arranged between said first keyboard and said display means.

10. The apparatus of claim 1 wherein said central control unit means operates said apparatus in such a manner that corrections may be made to said entered characters after they are displayed by said display means and before they are either stored by said key character storage, printed by said printer or enciphered by said cipher computer.

11. The apparatus of claim 10 wherein said control unit means operates said apparatus in such a manner that entered characters are not shifted from said display means to either said key character storage, said printer or said cipher computer until after a spaced feed button comprising a portion of said control input means is depressed by the operator of said apparatus.

12. An enciphering and deciphering apparatus operable in at least a key character storage mode, a plain text mode, and enciphering mode, and a deciphering mode, said apparatus comprising:

(A) a first keyboard for permitting an operator to enter text and key characters to be processed;

(B) a second keyboard for permitting an operator to enter control commands which determine the mode of operation of said apparatus;

(C) output means for recording an output text;

(D) a cipher computer and a key character storage associated therewith, said cipher computer for enciphering and deciphering characters applied thereto when said apparatus is operated in said enciphering and deciphering modes, respectively, said cipher computer to encipher and decipher said characters applied thereto in accordance with at least one key character stored in said key character storage;

(E) display means for displaying said entered text and key characters in a progressive stepwise manner; and (F) central control unit means respective to said control commands for operating said apparatus in the mode determined by said control commands, said central control unit means to:

(1) cause said entered key characters to be displayed by said display means in said progressive stepwise manner and to thereafter be stored in said key character storage when said apparatus is operated in said kay character storage mode;

(2) cause said entered text characters to be displayed by said display means in said progressive stepwise manner and to thereafter be recorded by said output means when said apparatus is operated in a plain text mode; and (3) cause said entered text characters to be displayed by said display means in said progressive stepwise manner and to thereafter to be enciphered by said cipher computer and finally recorded by said output means when said apparatus is operated in said enciphering mode.

13. The apparatus of claim 12 wherein said means responsive to said control commands operates said apparatus in such a manner that corrections may be made to said entered characters after they are displayed by said display means and before they are either stored by said key character storage, recorded by said output means or enciphered by said cipher computer.

* * * * *